United States Patent
Maurio et al.

[11] Patent Number: 6,118,932
[45] Date of Patent: Sep. 12, 2000

[54] METHOD AND ARRANGEMENT FOR A HIGH VOLTAGE SINGLE-STAGE VARIABLE SPEED DRIVE

[75] Inventors: Joseph M. Maurio, Waterford; Gregory A. Duba, Stonington, both of Conn.; Edgar S. Thaxton, Bradford, R.I.

[73] Assignee: Electric Boat Corporation, Groton, Conn.

[21] Appl. No.: 09/208,115

[22] Filed: Dec. 9, 1998

Related U.S. Application Data

[63] Continuation-in-part of application No. 09/046,076, Mar. 23, 1998, Pat. No. 5,933,339.

[51] Int. Cl.⁷ ................................. H02P 5/28; H02M 7/00
[52] U.S. Cl. ........................... 388/811; 388/812; 318/800
[58] Field of Search ................ 318/34–88, 800–832; 307/60–83; 363/37, 31, 32, 132, 137; 388/811, 800, 812

[56] References Cited

U.S. PATENT DOCUMENTS

| | | |
|---|---|---|
| 3,970,914 | 7/1976 | Salzmann et al. . |
| 4,172,991 | 10/1979 | Akamatsu et al. . |
| 4,394,610 | 7/1983 | Dolland . |
| 4,663,702 | 5/1987 | Tanaka . |
| 4,965,709 | 10/1990 | Ngo ............................................ 363/37 |
| 5,031,088 | 7/1991 | Tanaka . |
| 5,214,366 | 5/1993 | Hollmann . |
| 5,233,280 | 8/1993 | Ghosh . |
| 5,373,436 | 12/1994 | Yamaguchi et al. . |
| 5,402,054 | 3/1995 | Eckersley . |
| 5,460,244 | 10/1995 | Tanahashi ............................... 187/293 |
| 5,514,944 | 5/1996 | Miyazaki ................................. 318/800 |
| 5,517,063 | 5/1996 | Schantz, Jr. et al. . |
| 5,602,725 | 2/1997 | Venkataramanan . |
| 5,625,545 | 4/1997 | Hammond . |
| 5,638,263 | 6/1997 | Opal et al. . |
| 5,644,483 | 7/1997 | Peng et al. . |
| 5,657,217 | 8/1997 | Watanabe et al. . |
| 5,687,071 | 11/1997 | Debruyne et al. . |
| 5,731,970 | 3/1998 | Mori et al. ............................... 363/132 |
| 5,801,936 | 9/1998 | Mori et al. ............................... 363/132 |
| 5,909,367 | 6/1999 | Change . |
| 5,929,519 | 7/1999 | Mori et al. ............................... 257/725 |

*Primary Examiner*—Paul Ip
*Attorney, Agent, or Firm*—BakerBotts, LLP

[57] ABSTRACT

A high voltage, single-stage variable speed motor power supply utilizes direct AC-to-AC converters that do not have any intermediate DC link, along with a multi-level, multi-phase, multi-circuit variable speed motor drive and a motor in which a stator is wound with a number of multi-phase circuits. Each multi-phase circuit includes semiconductor switches arranged in drive switch pairs which are operated to produce an effective DC supply with the switches being controlled so that the most positive line-to-line source voltage is utilized for the inversion process.

14 Claims, 15 Drawing Sheets

6,118,932

1

METHOD AND ARRANGEMENT FOR A HIGH VOLTAGE SINGLE-STAGE VARIABLE SPEED DRIVE

REFERENCE TO RELATED APPLICATIONS

This application is a continuation-in-part of application Ser. No. 09/046,076 filed Mar. 23, 1998, now U.S. Pat. No. 5,933,339.

BACKGROUND OF INVENTION

This invention relates to methods and arrangements for high voltage single-stage variable speed drives for electric motors.

The Opal et al. U.S. Pat. No. 5,683,263 discloses a low and medium voltage pulse width modulated AC/DC power conversion method and apparatus by which AC power is converted to DC power through a transformer with multiple secondary power cells which may be shifted in phase and the maximum output of each power cell may be less than the line-to-line voltage. The power output can have variable voltage and current which can be controlled using pulse width modulation techniques.

The Hammond U.S. Pat. No. 5,625,545 discloses an electric drive arrangement for controlling medium voltage alternating current motors which includes a multi-phase power transformer with multiple secondary windings providing multiple phase power to multiple power cells each of which has a single-phase output and is controlled by a pulse width modulation controller. Primary and secondary windings in the power transformer may be star or mesh connected and the secondary windings may be shifted in phase. Since the power cells are connected in series, the maximum output voltage for each cell may be less than the maximum line-to-line voltage. Pulse width modulation may be effected using a bridge converter composed of semiconductor switches in the form of power transistors connected in an H-bridge configuration.

The Watanabe U.S. Pat. No. 5,657,217 discloses a multiple-coupled power converter comprising two converter circuits having switches which are driven by corresponding pulse width modulation generators, depending on the voltage and phase of an input AC waveform. Three-phase outputs are provided to a load through inductive reactors. The patent to Eckersley U.S. Pat. No. 5,402,054 describes a variable speed drive control for a three-phase AC motor utilizing a plurality of single-phase semiconductor power circuits. Within each of the power circuits SCRs are selectively switched to conduct upper and lower half cycles to the output waveform for a given phase. Multiple rectifier H-bridge circuits for each phase of a power system are disclosed in the Debruyne et al. U.S. Pat. No. 5,687,071, while the patent to Schantz, Jr. et al. U.S. Pat. No. 5,517,063 discloses plural Y-connected inverter circuits and the Yamaguchi U.S. Pat. No. 5,373,436 is generally directed to a multi-phase variable speed motor drive.

Each of the prior art arrangements, however, has shortcomings and disadvantages in terms of efficiency of operation and distortion across the entire range of operating speeds of an electric motor.

SUMMARY OF THE INVENTION

Accordingly, it is an object of the present invention to provide a method and arrangement for a high voltage, single-stage variable speed drive which overcomes disadvantages of the prior art.

2

Another object of the invention is to provide a high voltage, single-stage variable speed drive which operates efficiently over a wide motor speed range while producing output voltages and currents having very low distortion.

These and other objects of the invention are attained by providing a high voltage, single-stage variable speed motor power supply utilizing direct AC-to-AC converters that do not have an intermediate DC linkage, along with a multi-level, multi-phase, multi-circuit variable speed motor drive and a motor in which a stator is wound with a number of multi-phase circuits in which semiconductor switches in the drive switch pairs are operated to provide an effective DC supply with subsequent inversion and in which the power switches are controlled so that the most positive line-to-line source voltage is utilized for the inversion process.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
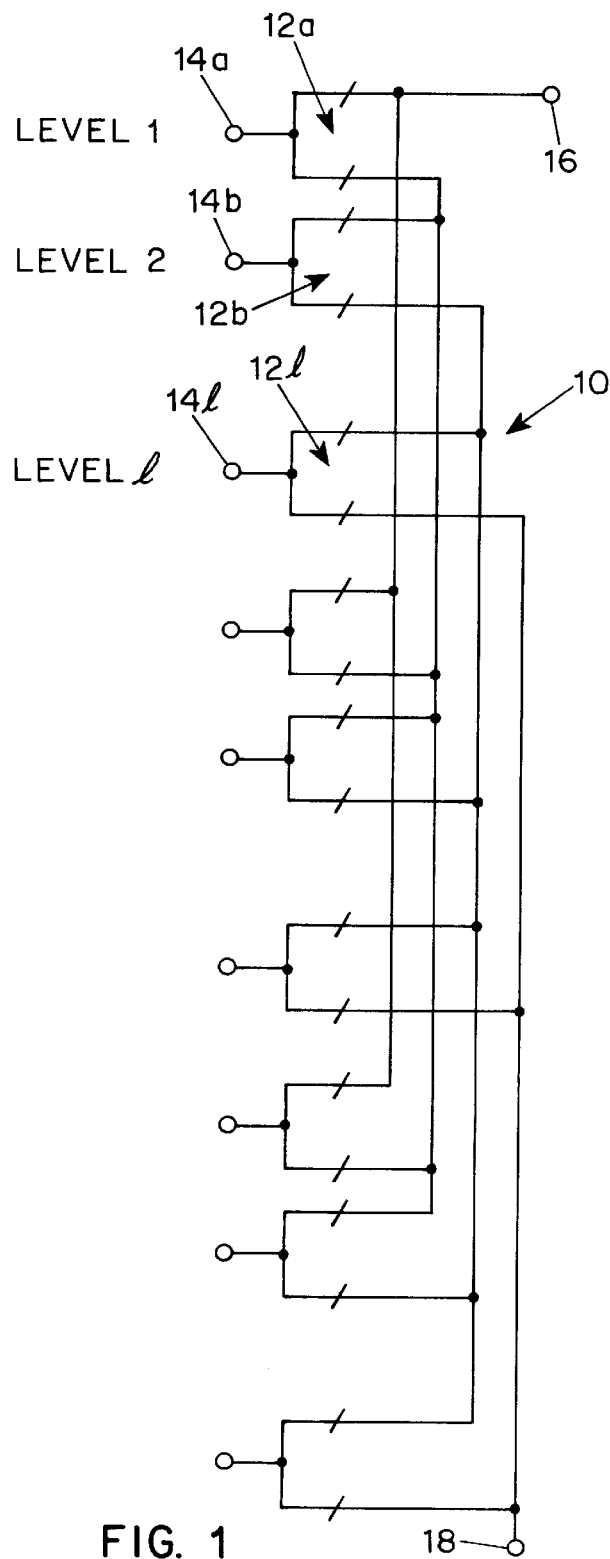
FIG. 1 is a schematic diagram illustrating an n-phase, l-level, single-stage power converter.
Figure 2A:
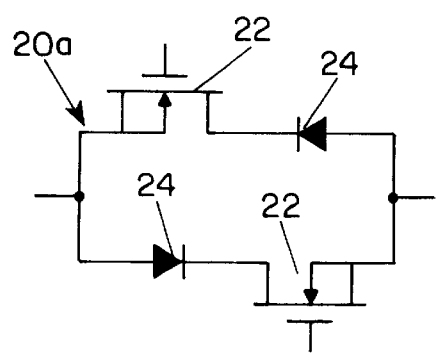
FIGS. 2a–2d illustrate representative bidirectional switch arrangements for a single-stage motor drive.
Figure 2B:
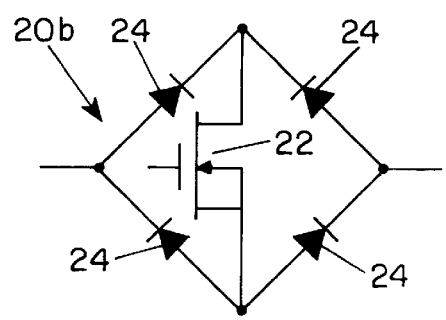
Figure 2C:
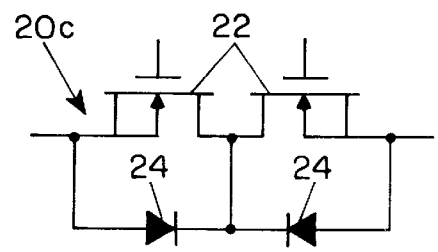
Figure 2D:
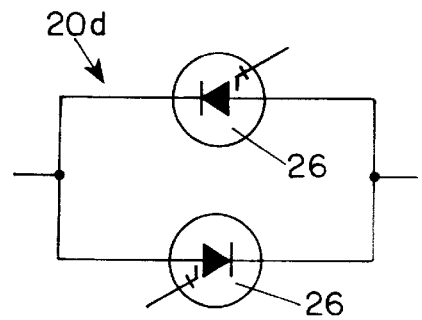
Figure 3A:
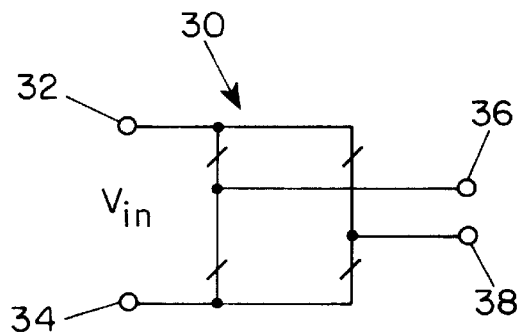
FIG. 3a is a schematic illustration of a single-phase H-bridge.

FIG. 1 illustrates schematically a motor drive 10 consisting of a series of pairs of bidirectional switches 12a, 12b . . . 12l, having corresponding input terminals 14a, 14b . . . 14l, which receive AC voltage from isolated power sources not shown. The outputs of the switch pairs are connected in series to add their output voltages to produce a cumulative output voltage between an output phase terminal 16 and a common neutral terminal 18. Discrete bidirectional switches are not yet commercially available. However, the bidirectional switches may be conventional two-quadrant power semiconductor switches such as IGBTs, MOFSETs or BJTs connected in series with corresponding diodes. FIGS. 2a–2c illustrate three representative bidirectional switch arrangements 20a, 20b and 20c utilizing one or more semiconductor switches 22 and diodes 24. FIG. 2d shows a bidirectional switch arrangement 20d utilizing two three-quadrant switches 26 such as MCTs. When the switches and diodes in these arrangements are connected as shown each switch pair will perform the functions of the top rail or the bottom rail switches of an H-bridge 30 of the type shown in FIG. 3a in which an input voltage $V_{in}$ applied across two terminals 32 and 34 produces an output voltage at two terminals 36 and 38 which is either $+V_{in}$, $-V_{in}$, or 0 depending upon the states of the switches in the bridge.

Figure 3B:
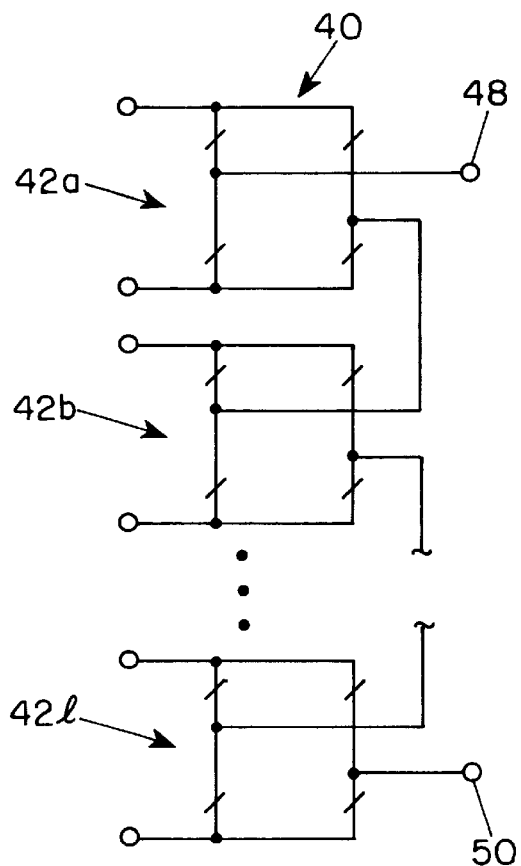
FIG. 3b is a schematic illustration of a multi-level phase driver.
Figure 4:
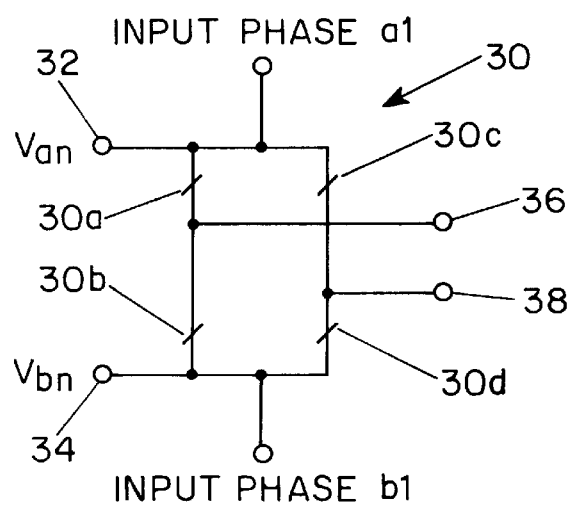
FIG. 4 is a schematic illustration showing an H-bridge supplied by a line-to-line input voltage.

FIG. 3b illustrates a series of H-bridges 42a, 42b . . . 42l arranged in a multi-level phase driver 40 to produce the line-to-neutral voltage for a particular output phase. Each of the input voltages applied to the bridge input terminals is electrically isolated from the other input voltages so that the bridge output voltages applied across two output terminals 48 and 50 for the phase driver are cumulative. The number of levels used in the multi-level driver is determined by the desired line-to-line output voltage and the voltage ratings of the power semiconductor switches in the H-bridges. In a preferred embodiment, each switch pair is connected to one phase of a multi-phase AC voltage source, which can be any isolated input such as a transformer, separate AC sources, or a multi-phase generator. Each H-bridge 30 includes upper and lower left switches 30a and 30b and upper and lower right switches 30c and 30d as illustrated in FIG. 4 and has a line-to-line voltage ($V_{an}-V_{bn}$, $V_{bn}$, for example) as its input. The switch pairs are connected in series or "levels"as shown in FIG. 1 to develop the line-to-line neutral voltage for a particular output phase and each switch pair functions either as the upper pair or the lower pair of switches in an H-bridge or is disabled, depending on the input voltage magnitudes. The algorithms for controlling the switching in the bridges are described hereinafter.

Figure 5A:
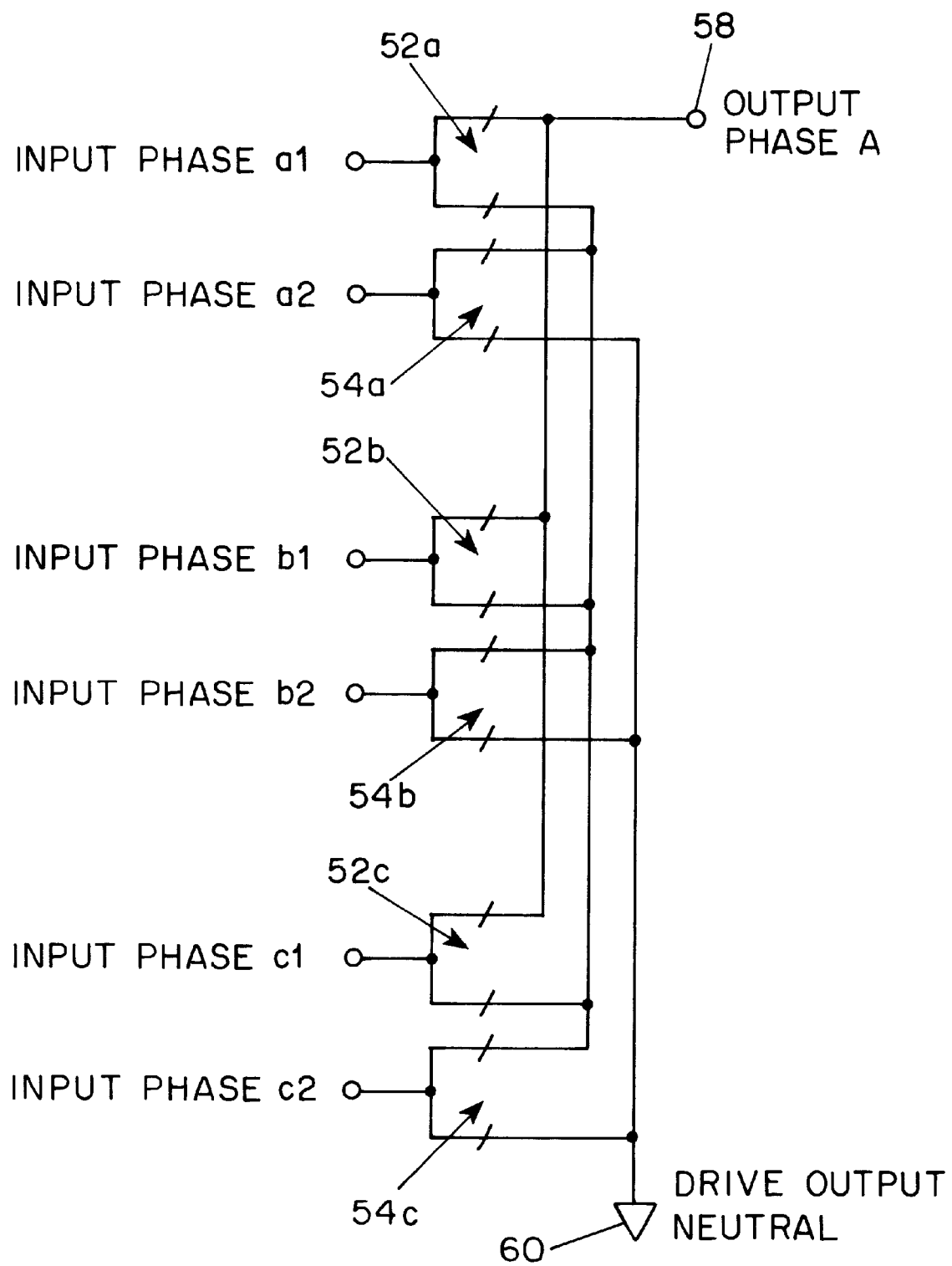
FIGS. 5a and 5b illustrate multi-level phase drivers for two and three-levels, respectively.
Figure 5B:
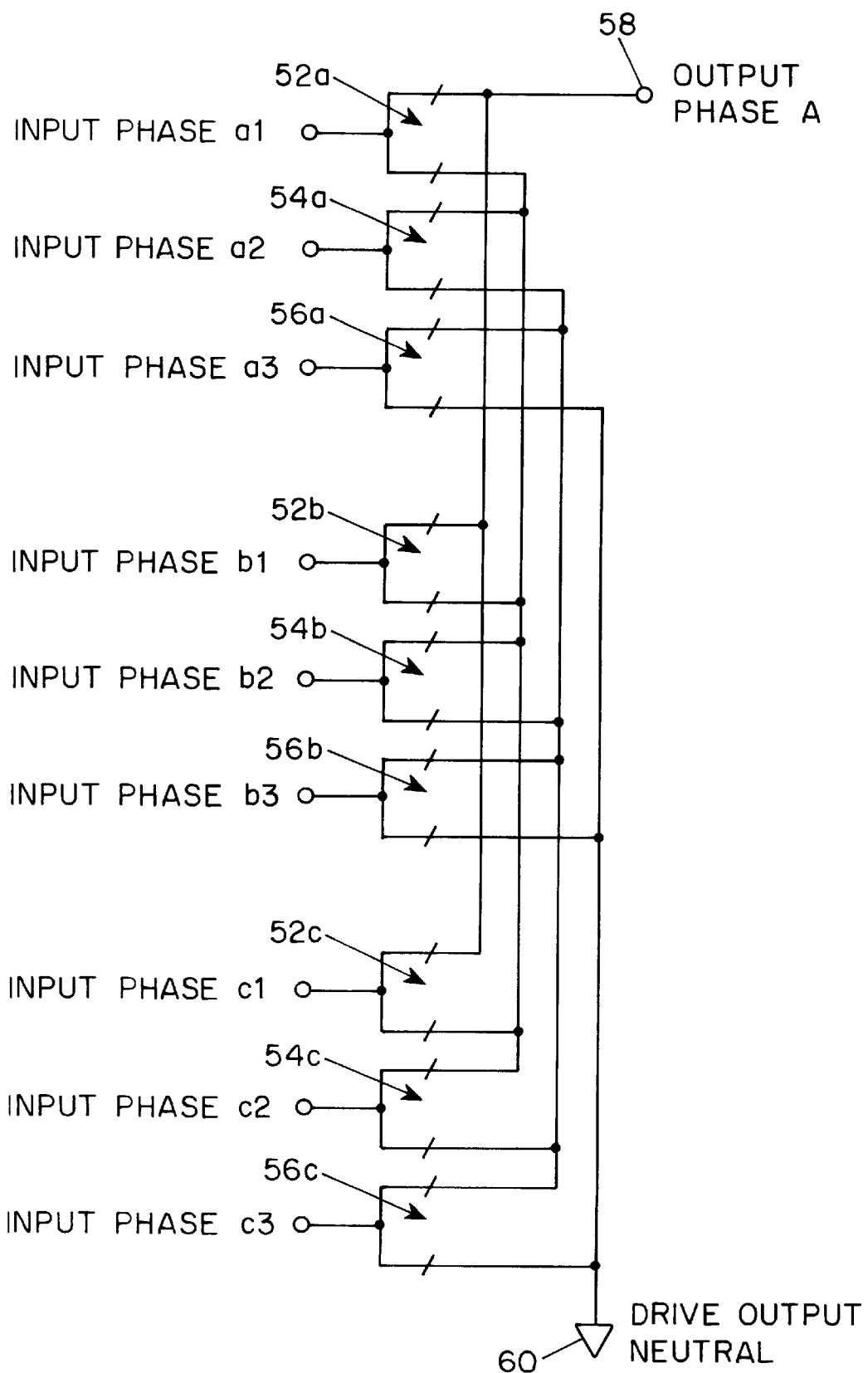
Figure 6:
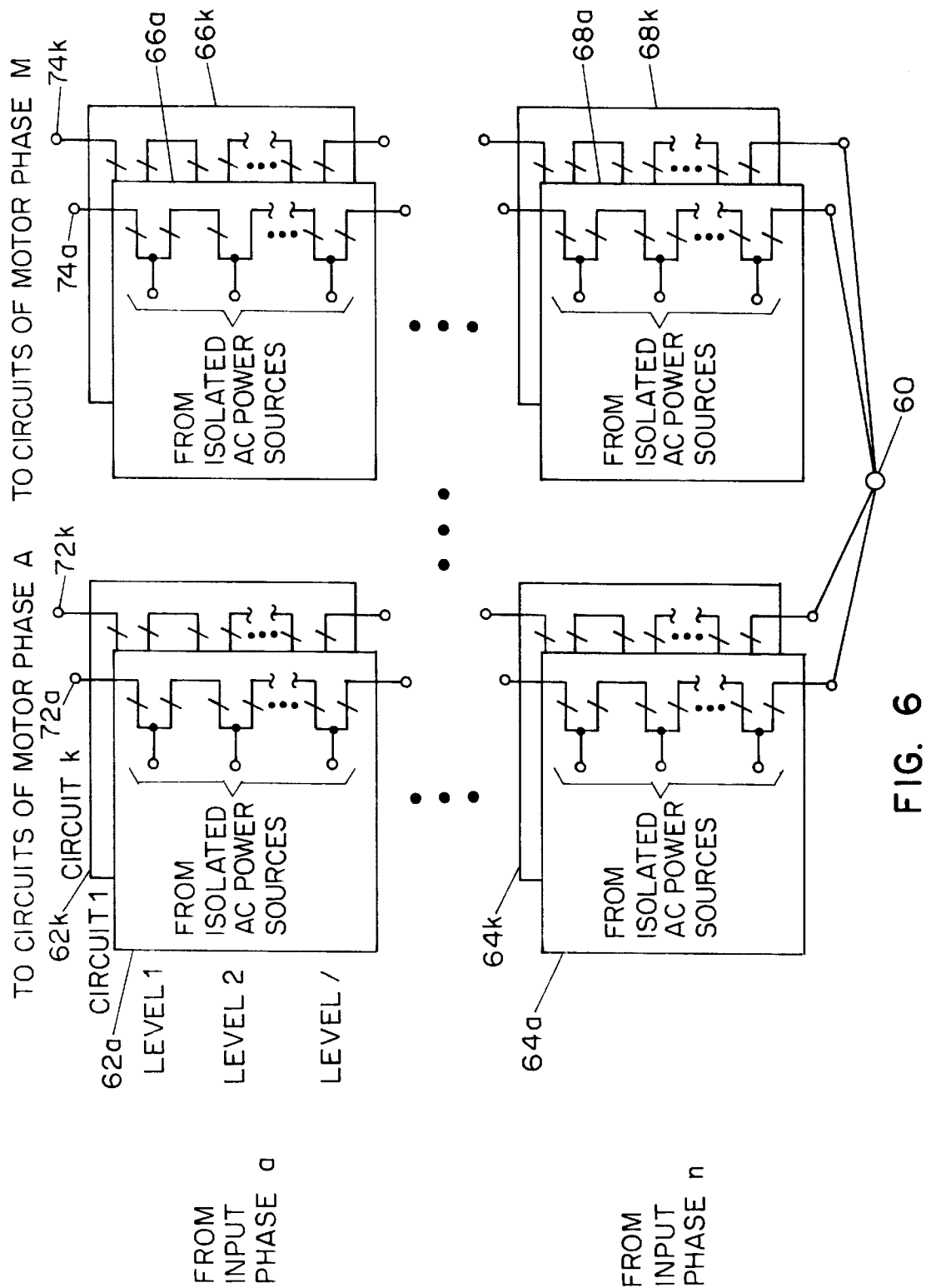
FIG. 6 is a schematic block diagram showing a multi-level, multi-phase, multi-circuit motor drive according to the invention.

FIG. 5a illustrates the interconnection method of H-bridge switches in accordance with the invention for a two-level, three-phase input and FIG. 5b shows the interconnection method for a three-level, three-phase input, each of these arrangements constituting a single-phase output converter. Thus, in FIG. 5a two H-bridge switch pairs, 52a and 54a, receive two phase a inputs, two switch pairs, 52b and 54b, receive two phase b inputs, and two switch pairs, 52c and 54c, receive two phase c inputs. In FIG. 5b, three H-bridge pairs, 52a, 54a and 56a, receive three phase a inputs, three H-bridge pairs, 52b, 54b and 56b, receive three phase b inputs, and three further H-bridge pairs, 52c, 54c and 56c, receive three phase c inputs. Each phase of the output is presented between a phase driver output terminal 58 and a neutral terminal 60. A plurality of such multi-level phase drivers is then interconnected in a wye configuration or a delta configuration according to the number of output phases and circuits, where the number of multi-level phase drivers required is equal to the number of output phases times the number of output circuits. FIG. 6 is a schematic diagram showing the arrangement of a multi-level, multi-phase, multi-circuit motor drive having l levels, n input phases and k circuits, each of the phase drivers, 62a, 62k . . . 64a, 64k . . . 66a, 66k . . . 68a, 68k . . . , being connected in a wye configuration between a neutral point 60 and a corresponding circuit output terminal 72a, 72k . . . 74a, 74k . . .

Figure 7:
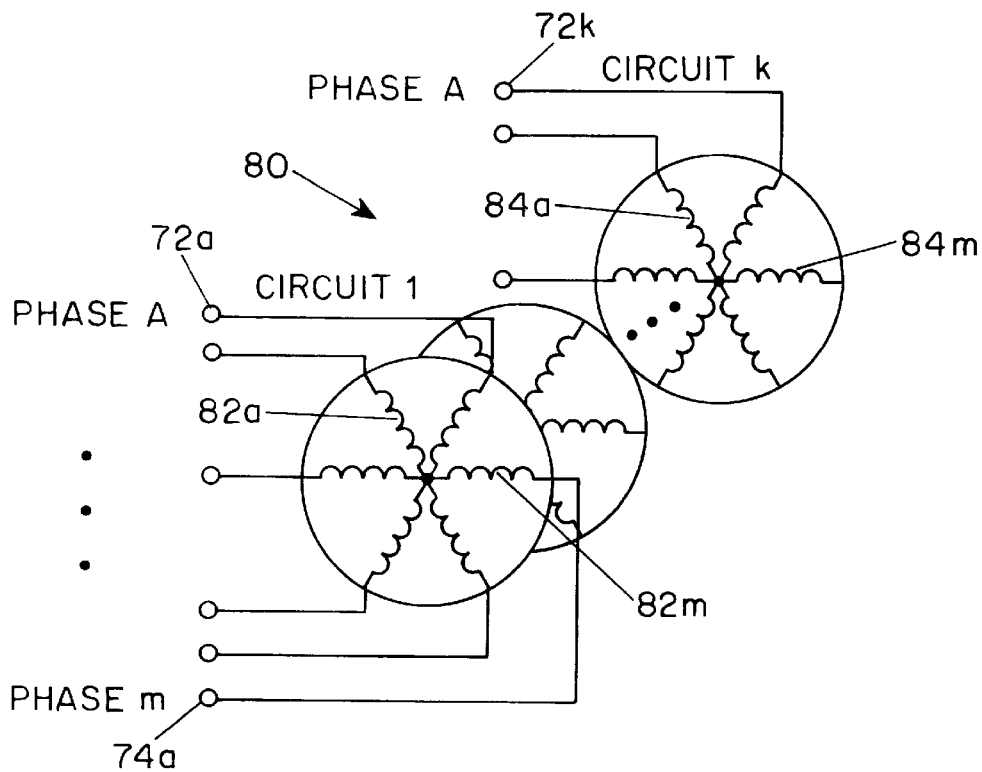
FIG. 7 is a schematic illustration of a multi-phase, multi-circuit motor driven by the motor drive of FIG. 6.

FIG. 7 schematically illustrates a multi-phase, multi-circuit motor 80 arranged to be driven by the motor drive of FIG. 6, the windings 82a . . . 82m in the motor being arranged so that each circuit comprising the phases a-m is electrically isolated from the remaining circuits.

Figure 8A:
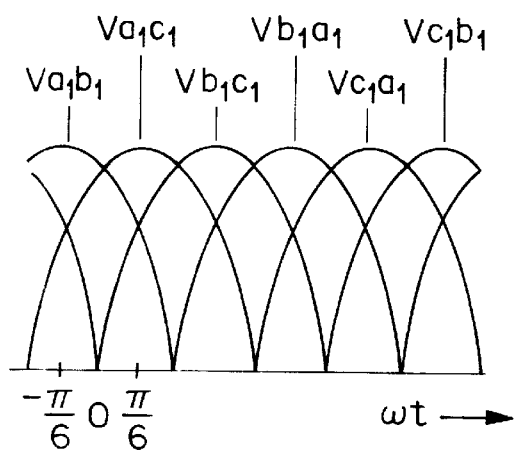
FIGS. 8a and 8b are graphical illustrations showing rectification of three-phase input voltages.
Figure 8B:
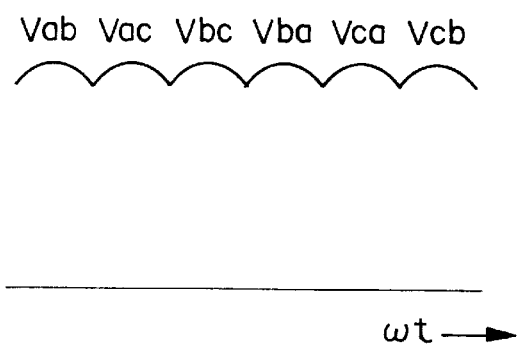

The drive switch pairs are operated so as to provide a power output which is equivalent to a DC power supply, i.e., an "effective" DC power supply and a subsequent inversion process. This effective rectification is accomplished by controlling the power switches so that, at any instant, only the most positive line-to-line source voltage is utilized for the inversion process thereby creating an effective DC rail for the inversion process as shown in FIGS. 8a and 8b. This inversion process is similar to that employed in matrix converters. FIG. 8a shows the voltages $Va_1b_1$, $V_{a_1}c_1$ and $Vb_1c_1$ generated from phases $a_1$, $b_1$ and $c_1$ shown in FIGS. 5a and 5b, and FIG. 8b shows the effect of switching of the H-bridges so that only the highest voltages are passed to the output. For example, when the input voltage $Va_1b_1$ is greatest, only the switches connected to phases $a_1$ and $b_1$ are utilized. The switches connected to the $a_1$ phase emulate the top switches of the H-bridges and the switches connected to the $b_1$ phase emulate the bottom switches. This rectification process produces an input generator current that contains low order harmonics of the input frequency. If the rectification process is accomplished by using pulse width modulation of the input voltage, as described, for example in L. Huber, D. Borojevic and N. Burany, "Analysis, Design and Implementation of the Space-Vector Modulator for Forced Commutated Cycolconverters," *IEE Proc.-B*, vol. 139, no. 2, pp. 103–113, Mar. 1992, for matrix converters, and the carrier frequency for this process is set sufficiently higher than the input generator frequency, then the input harmonics are high enough to permit easy filtering. Consequently, only small input filtering components are required for acceptable power quality.

This motor drive arrangement provides a high effective switching frequency, i.e. a high frequency of the flux component in the motor resulting from the ripple current generated by the motor drive output voltage waveform. The effective switching frequency is achieved by implementation of a two-dimensional interleaved pulse width modulation algorithm that allows operation of the power semiconductor switches in their most efficient operating mode while producing a switching waveform at the motor drive terminals that is more than an order of magnitude higher than the pulse width modulation frequency of a single switch. Two algorithms, which are described in the Duba et al. U.S. Pat. No. 5,933,339, the disclosure of which is incorporated by reference herein, can produce this two-dimensional interleave as described below.

The effective switching frequency produced by the motor drive is a function of the pulse width modulation carrier frequency, the number of levels, and the number of circuits according to the relationship $$f_{eff}=2l/k \, f_{PWM}$$

where $f_{eff}$ is the effective switching frequency seen by the motor windings;

$f_{PWM}$ is the carrier switching frequency;

l is the number of series levels;

k is the number of motor drive circuits.

The pulse width modulation algorithm used to produce the switching pattern is a modification of the basic triangular PWM algorithm in which a carrier waveform is compared to a reference waveform that represents the desired output waveform. Other PWM algorithms can also be employed effectively.

In the preferred embodiment the carrier waveforms for an individual H-bridge are a triangle wave at its complement. Referring to FIG. 4, the conditions of the left pair of switches, 30a and 30b, in the H-bridge 30 are determined by comparison of the normal triangle with the reference and the condition of the right pair of switches, 30c and 30d, are determined by comparison of the complementary triangle with the reference level. Thus, the logic for the right side switches, 30c and 30d, is reversed from that of the left side switches. When the upper left and lower right switches are on, the output voltage of the bridge is the line-to-line voltage, i.e. $+V_{in}$, and when the lower left and upper right switches are on the output voltage of the bridge is the negative of the line-to-line voltage $(-V_{in})$. When either both upper switches or both lower switches are on the output voltage of the bridge is 0.

The invention utilizes a previously know algorithm to interleave the triangle carrier waveforms of the H-bridge levels in a phase driver as described in the above-mentioned U.S. Pat. No. 5,933,339. The reference waveforms for the multiple motor drive circuits are integrated into this algorithm, resulting in the effective switching frequency described above.

Either of two algorithms may be used for interleaving of the levels and circuits of the phase drivers.

Interleave Algorithm 1

Normal and complementary triangle waveforms of the desired switching frequency are established for each H-bridge level of a multi-level phase driver. The triangle carrier waveforms of each level are phase shifted with respect to each other by an angle $\alpha_{lvl}=360°/l$, where l is the number of phase levels of a multi-level phase driver.

Figure 9:
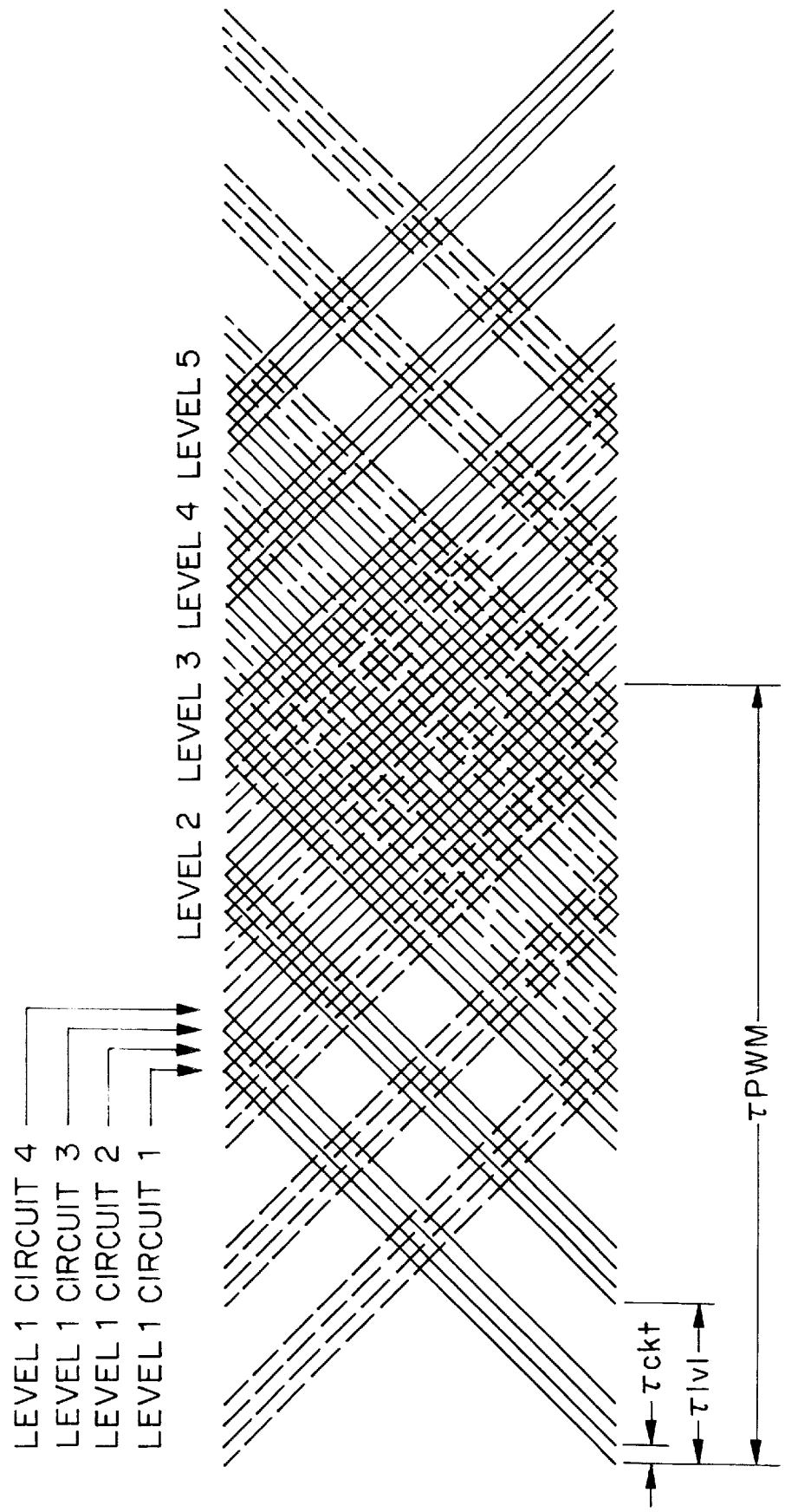
FIG. 9 is a graphical illustration showing two-dimensional interleaved carrier reference waveforms.

In addition, normal and complementary triangle carrier waveforms of the desired switching frequency are established for the multi-level phase drivers of the multiple circuits such that the carrier waveforms of each circuit of the level of interest are phase-shifted with respect to the corresponding circuits of the same level by the angle $\alpha_{ckt}=\alpha_{lvl}/2k$ where k is the number of power converter circuits. The required carrier waveforms for a five level, four circuit static power converter are illustrated in FIG. 9 which shows the normal reference triangle waveforms in solid lines and the complementary reference waveforms in dash lines.

Interleave Algorithm 2

The second two-dimensional interleave algorithm is similar to the first where normal and complementary triangle carrier waveforms of the desired switching frequency are established for each H-bridge level of a multi-level phase driver. In this case, however, the triangle carrier waveforms of each level are phase-shifted with respect to each other by an angle $\alpha_{lvl}=360°/2l$ where l is the number of levels of a multi-level phase driver. In addition, normal and complementary triangle carrier waveforms of the desired switching frequency are established for the multi-level phase drivers of the multiple circuits, such that the carrier waveforms of each circuit of the level of interest are phase-shifted with respect to the corresponding circuits of the same level by the angle $\alpha_{ckt}=\alpha_{lvl}/k$ where k is the number of static power converter circuits.

The time shifts between the PWM carrier waveforms for either of the above interleave algorithms are calculated as follows:

$\tau_{PWM}=1/f_{PWM}$ $\tau_{lvl}=1/f_{PWM} \cdot \alpha_{lvl}/360$ $\tau_{ckt}=1/f_{PWM} \cdot \alpha_{ckt}/360$ Each of the levels is controlled separately to achieve the rectification-inversion process and the pulse wave modulation inversion is accomplished in a separate step utilizing the carrier triangle signals and the desired sinusoidal reference as described above. The individual level controller determines which input line-to-line voltage is most positive and then directs the pulse wave modulator inverter switch signals to the proper switches.

Figure 10A:
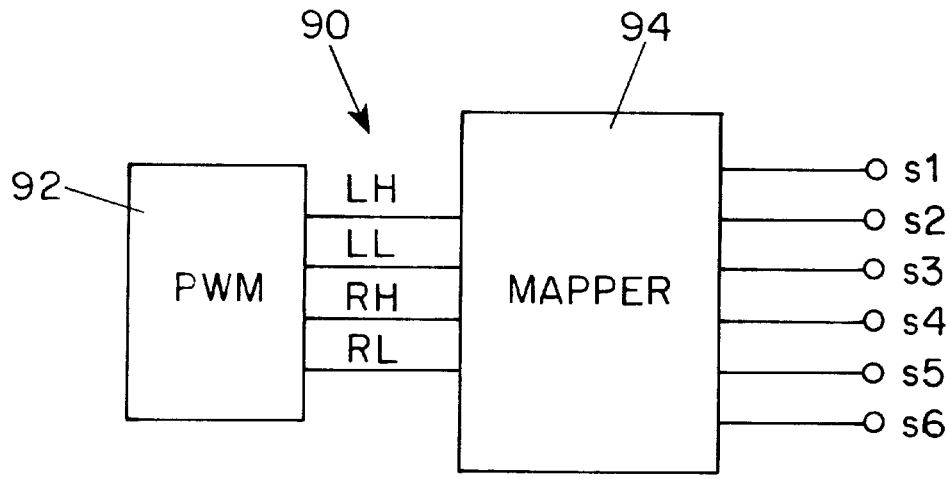
FIG. 10a is a schematic block diagram illustrating the arrangement of a controller.
Figure 10B:
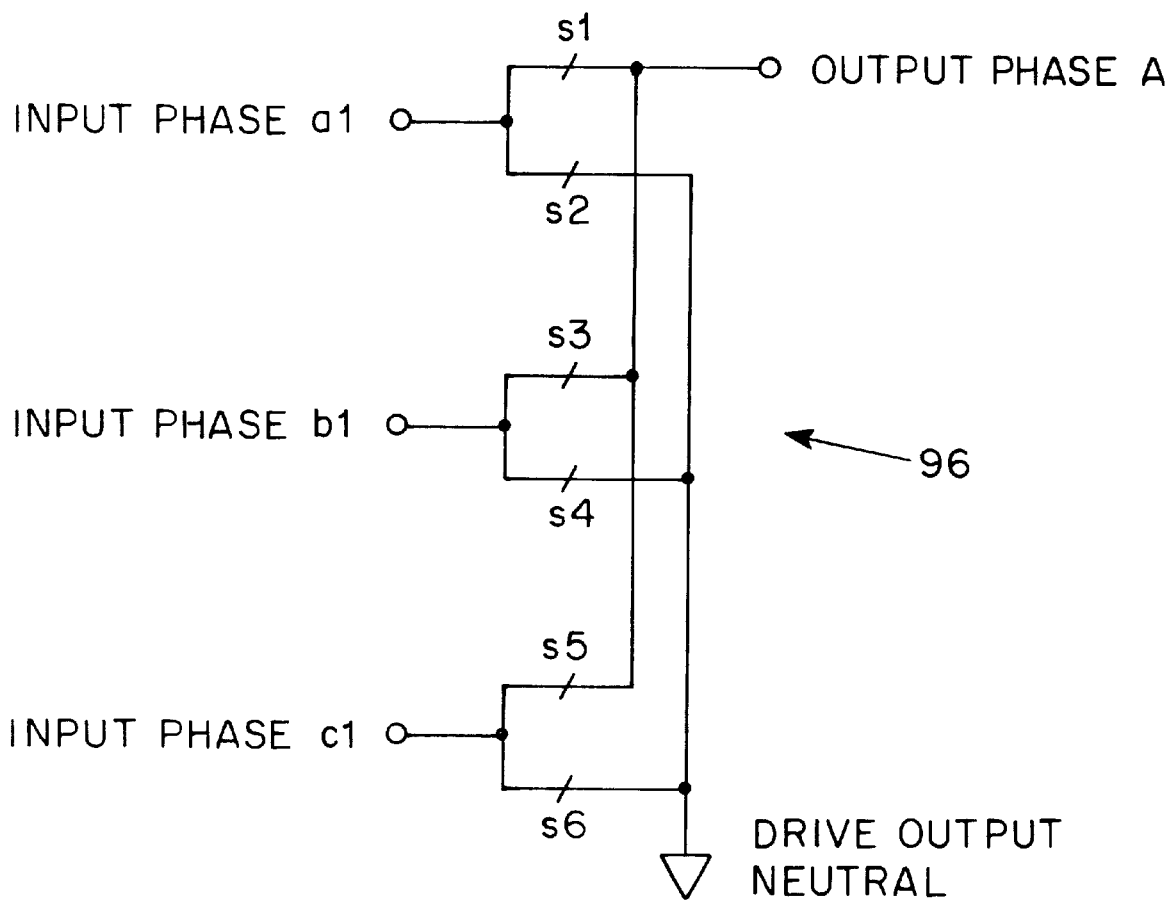
FIG. 10b is a schematic circuit diagram showing a single-level three-phase input, single-phase output drive circuit.

FIG. 10a illustrates a representative embodiment of a single-level, three-phase input, single-phase output drive circuit controller 90. The controller 90 generates logic level signals for four switches of an H-bridge in a pulse wave modulator 92 based on one of the algorithms discussed above, producing signals LH, LL, RH, and RL corresponding to the left side high, left side low, right-side high and right-side low switches (30a, 30b, 30c and 30d) in FIG. 3, respectively, of the H-bridge circuit 30 and supplies them to a signal mapper 94. A separate pulse width modulation generator 92 and signal mapper 94 are needed for every level for each output phase of the drive. The signal mapper 94 distributes the logic signals from the pulse width modulation generator to the appropriate four switches of the drive with the other switches for that level remaining open. A part of the controller 90 determines which input line-to-line voltage is most positive and supplies that information to the mapper 94. Table 1 below illustrates the sequence of mapping for the drive controller 90 shown in FIG. 10a to produce signals for the drive circuit 96 shown in FIG. 10b.

TABLE 1

Mapping Sequence for the Drive Circuit of FIG. 10a

| Highest Line-to-line Input Voltage | s1 | s2 | s3 | s4 | s5 | s6 |
|---|---|---|---|---|---|---|
| vab | LH | RH | LL | RL | off | off |
| vac | LH | RH | off | off | LL | RL |
| vbc | off | off | LH | RH | LL | RL |
| vba | LL | RL | LH | RH | off | off |
| vca | LL | RL | off | off | LH | RH |
| vcb | off | off | LL | RL | LH | RH |

The finite time required for commutation of power switches of single-stage converters has always been a major concern. DC-link dual stage converters typically accomplish commutation with anti-parallel diodes connected across the power electronic switches but, with the bidirectional nature of the switches of the single-stage converter, this arrangement is not feasible.

In accordance with the present invention, a multi-step switching procedure is provided to accomplish safe commutation. This procedure is derived from arrangements described in the literature for use with forced commutated cycloconverters such as disclosed in L. Huber, D. Borojevic and N. Burany, "Analysis, Design and Implementation of the Space-Vector Modulator for Forced Commutated Cycloconverters," IEEE Proc.-B., vol. 139, no. 2, pp. 103–113, Mar. 1992. In the illustrated embodiment, the commutation process involves two four-quadrant switches each connected to an input phase forming the DC rail. Any type of four-quadrant switch couple may be used where a couple is any top switch and its corresponding bottom switch of the same leg of an H-bridge.

Figure 11:
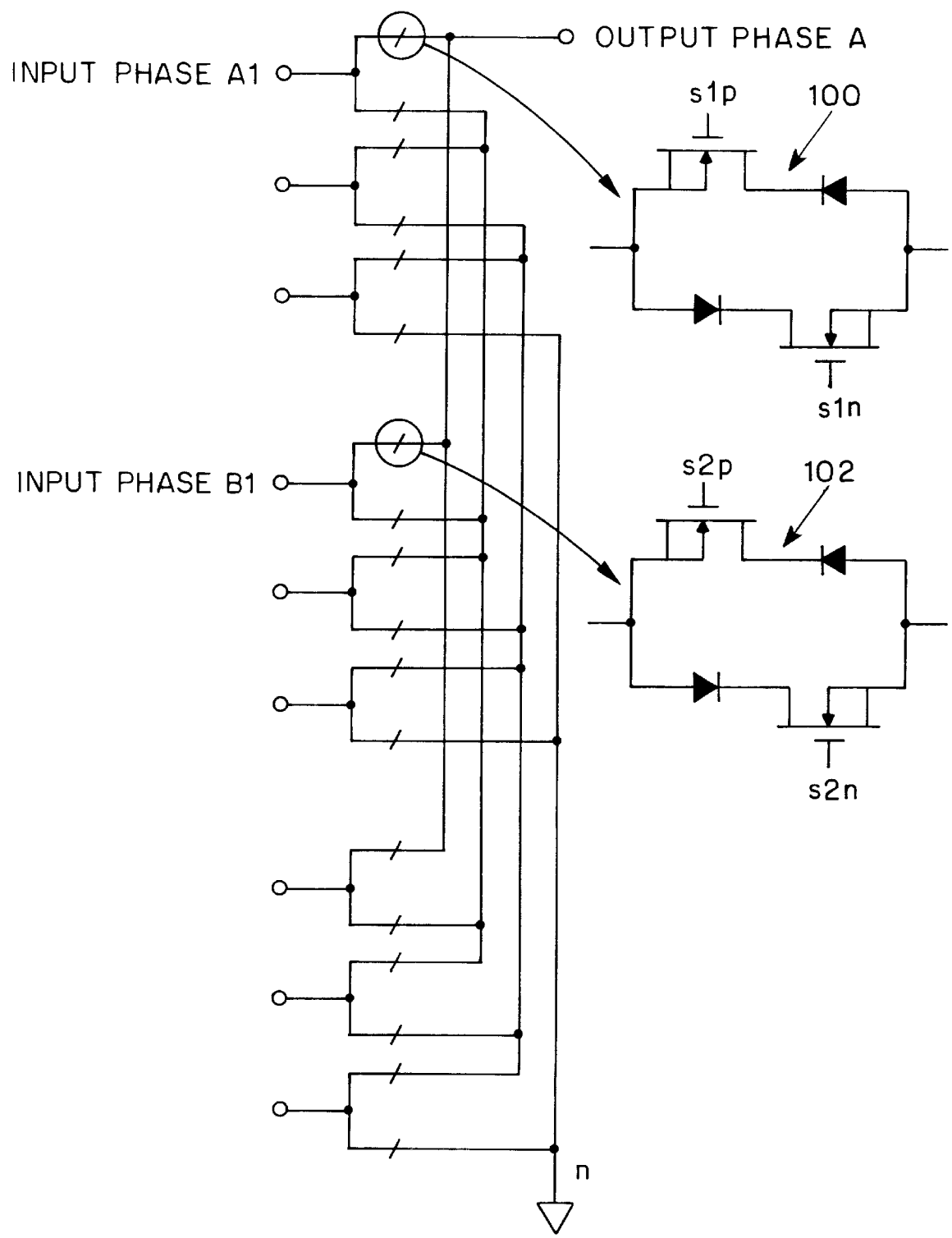
FIG. 11 is a schematic illustration of a four-quadrant switch to show the commutation procedure.

FIG. 11 illustrates an example of two four-quadrant switches 100 and 102 for use in a motor drive arrangement of the type shown in FIG. 5. It should be noted that a bidirectional switch in the on state corresponds to both positive and negative going switches turned on to aid in the commutation process. There are two possible commutation sequences that are determined by the polarity of the current passing through a switch that is initially in the on condition. In FIG. 11, two switches, s1p and s1n refer to the bidirectional switch that is initially in the on condition and two switches s2p and s2n are in the bidirectional switch 102 which is being turned on as the switch 100 is turned off. Table 2 below illustrates the two commutation sequences.

TABLE 2

Commutation Switching Sequences

| | s1→s2 Positive Initial Current | | | | s1→s2 Negative Initial Current | | | |
|---|---|---|---|---|---|---|---|---|
| Step | s1p | s1n | s2p | s2n | s1p | s1n | s2p | s2n |
| 1 | on | on | off | off | on | on | off | off |
| 2 | on | off | off | off | off | on | off | off |
| 3 | on | off | on | off | off | on | off | on |
| 4 | off | off | on | off | off | off | off | on |
| 5 | off | off | on | on | off | off | on | on |

The multi-stepped switching procedure is illustrated by the following example. Assume initially that the input voltage $V_{ab}$ or $V_{ba}$ is the highest and is being used as the "DC rail" and the switch s1 is closed and is conducting. The drive first directs that the switch s1 is opened and the switch s2 is closed for a positive initial current. The positive current transition steps shown in the left half of Table 2 will then be taken. Thus, the negative half of switch s1 is first turned off and the positive half of switch s2 is then turned on. If Van is greater than $V_{bn}$ current will continue to flow through the positive half of switch s1. If Van is less than $V_{bn}$ the current will transfer from the switch s1 to the switch s2 after which the positive half of the switch s1 is turned off. If the transfer has not occurred then current transfer is accomplished in that step. Finally, the negative half of switch s2 is turned on and the transition is completed. For a negative initial current the same sequence takes place except that the operation of the negative and the positive halves of the switches is reversed.

The motor drive arrangement according to the invention achieves very high full and part power efficiencies by implementing a load partitioning method as described in the above-mentioned application Ser. No. 09/046,076. Using this procedure the capacity of the motor drive system is partitioned according to the number of motor/motor drive circuits which are implemented so that each multi-phase circuit provides 1/k of the total power where k is the total number of circuits. By turning off selected carrier reference waveforms entire multi-level multi-phase circuits can be shut down, reducing the overall motor drive losses to make certain that the spectral performance of the output is not adversely affected as motor drive circuits are shut down. Symmetry must be maintained among the multi-phase circuits that remain in operation. Several load partitioning methods have been proposed to accomplish this.

Load Partitioning Method 1

In accordance with one method of load partitioning interleaved circuit carrier reference waveforms are selected for shutdown so that the phase shifts between the remaining carrier references are evenly distributed throughout the carrier period 1/2l where l is the number of levels. No modification of the remaining carrier waveforms is necessary. For example, in a four-circuit motor drive with carrier waveforms of the type shown in FIG. 9 the even numbered circuits can be shut down reducing the motor drive capacity by 50% and eliminating all losses with respect to the shut down circuits while leaving the remaining circuits symmetrically distributed. Additionally, one of the two remaining carriers can be shut down reducing the motor drive capacity 25%. This is the simpler method of partitioning load, but its flexibility is limited by the number of circuit combinations that can be used while assuring that symmetry is maintained.

Load Partitioning Method 2

The second load partitioning method allows motor drive circuits to be shut down one by one, permitting the motor drive rating to be partitioned in increments of 1/k so that the motor drive capacity can be closely tailored to the power required by the load. This is accomplished by shutting down the carrier reference waveform for one circuit and redistributing the remaining carrier reference waveforms according to the two-dimensional interleave methods described above. This method requires recalculation and redistribution of the carrier reference waveforms.

Load Partitioning Method 3

The third load partitioning method allows the motor drive levels to be shut down one by one. In this case the output voltage as well as the output power will be decreased in increments of 1/l where l is the total number of motor drive levels. The level which is shut down is controlled so that it has a 0 voltage output, i.e. both upper switches or both lower switches are kept on. It is also possible to use alternate connections or jumpers which bypass the connections of the shut-down level so that the shut-down unit can be removed from the drive for servicing or repair while the drive continues to operate. With the jumpers in place, the drive operates as though it were a drive with l-1 levels. This load partitioning method requires recalculation of the carrier waveforms.

Several configurations of the drive arrangement according to the invention were simulated using an Analogy, Inc. Saber simulator with the results shown in Table 3 and in the related illustrations in FIGS. 13–16.

TABLE 3

Summary of Simulation Plots

| FIG. | Description |
|---|---|
| 13 | Three Phase Set of Generator Line-to-Neutral Voltages and Currents |
| 14 | Levels 1, 2 and 3 Voltages for Phase A, Circuit 1 |
| 15 | Circuits 1 and 2 Phase A Output Voltages and Currents |
| 16 | Phase A Output Voltages and Ripple Currents for Circuits 1 and 2 |

Figure 12A:
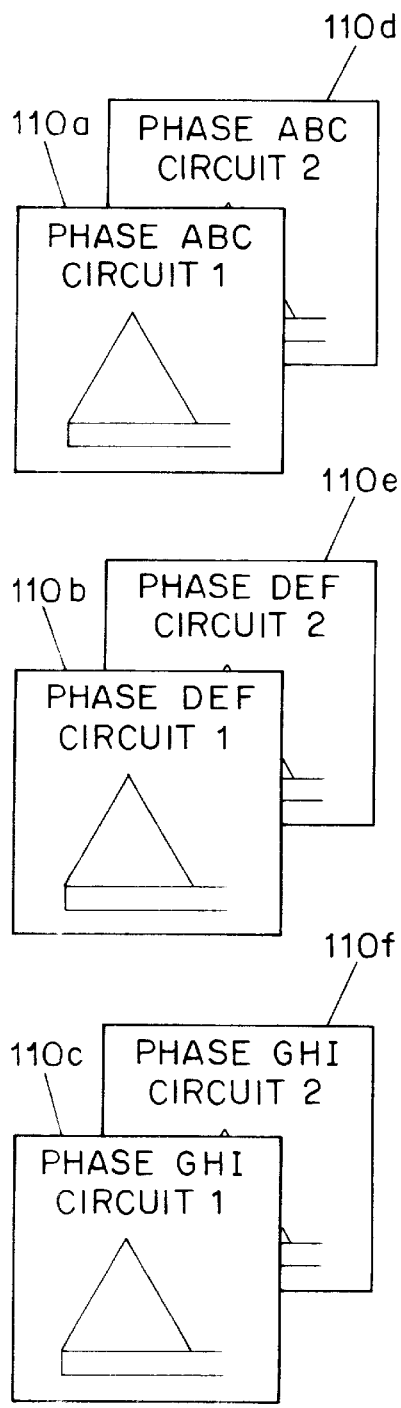
FIGS. 12a and 12b show a nine-phase generator with an indication of the phase relationships of the phases.
Figure 12B:
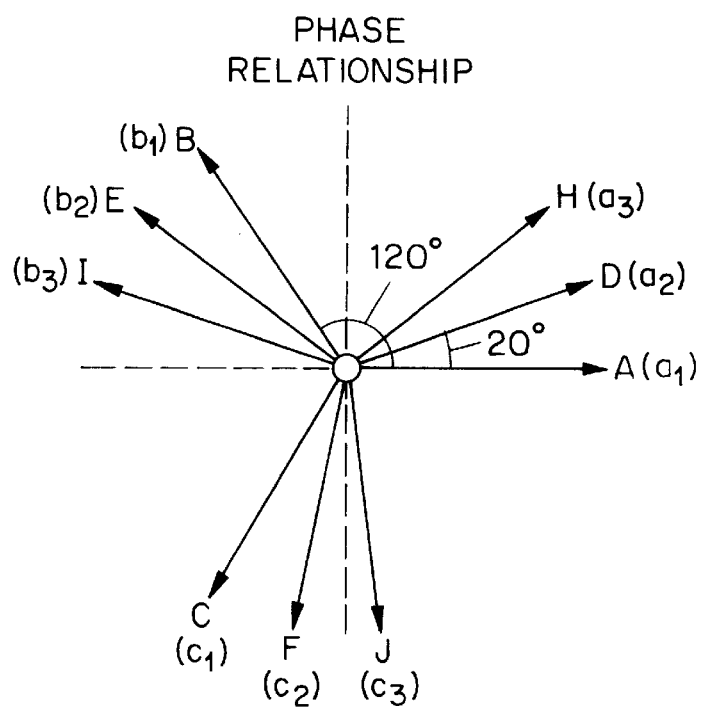
Figure 13:
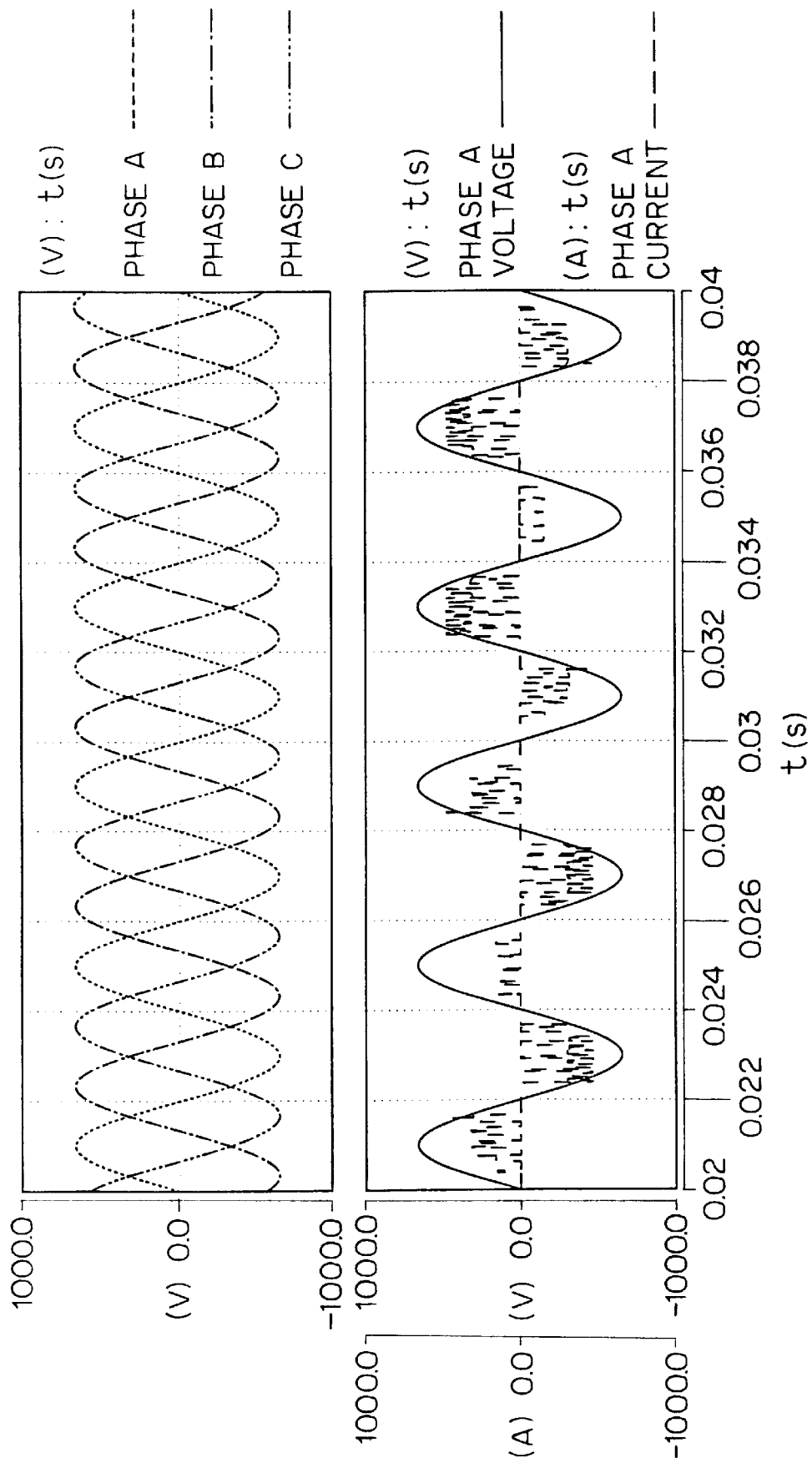
FIG. 13 is a graphical illustration showing the variations in voltages and currents for the three-phases of a three-phase generator.
Figure 14:
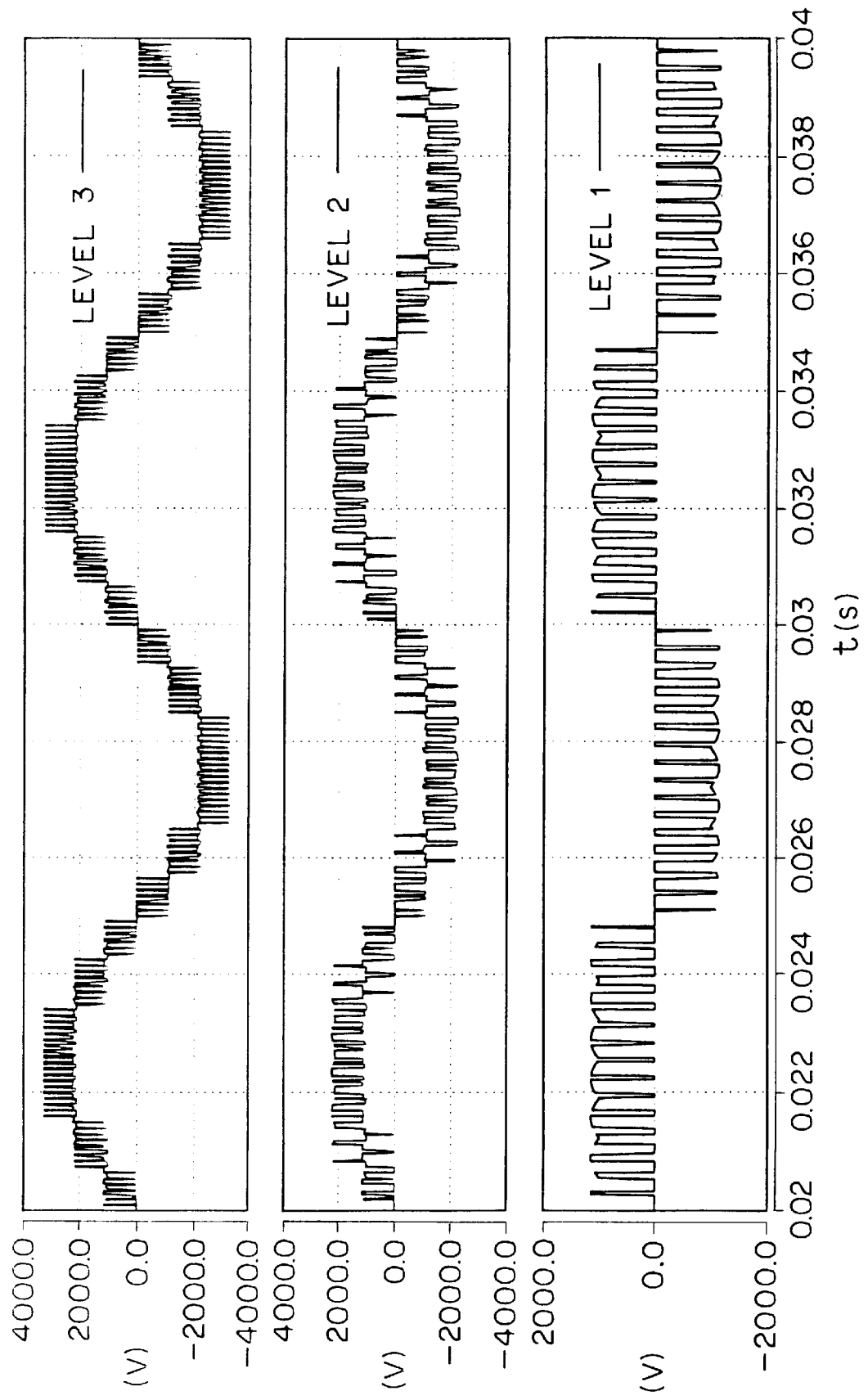
FIG. 14 is a graphical illustration showing the voltage levels for one phase and one circuit.
Figure 15:
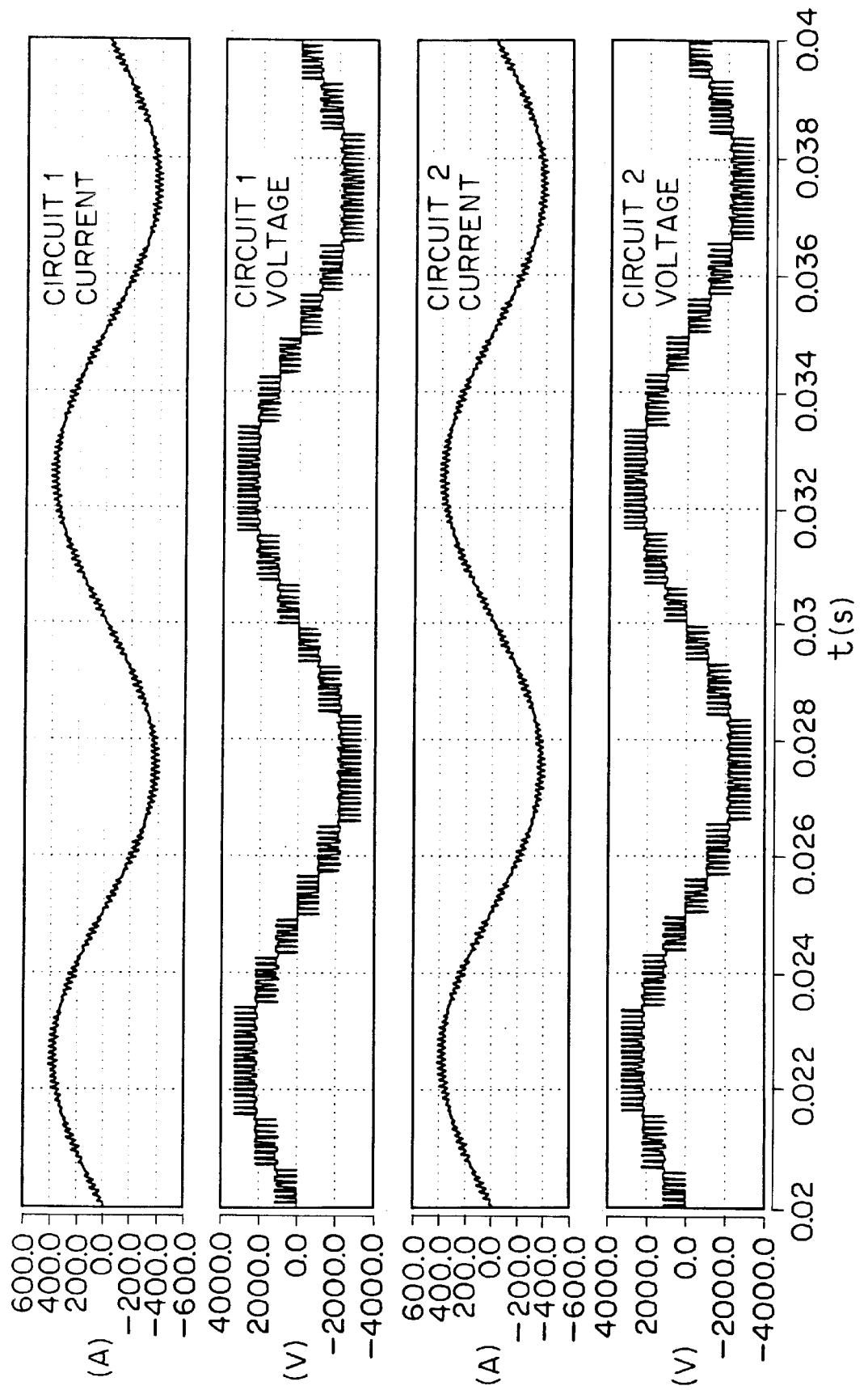
FIG. 15 is a graphical illustration showing the output voltages and currents for two circuits of one phase.
Figure 16:
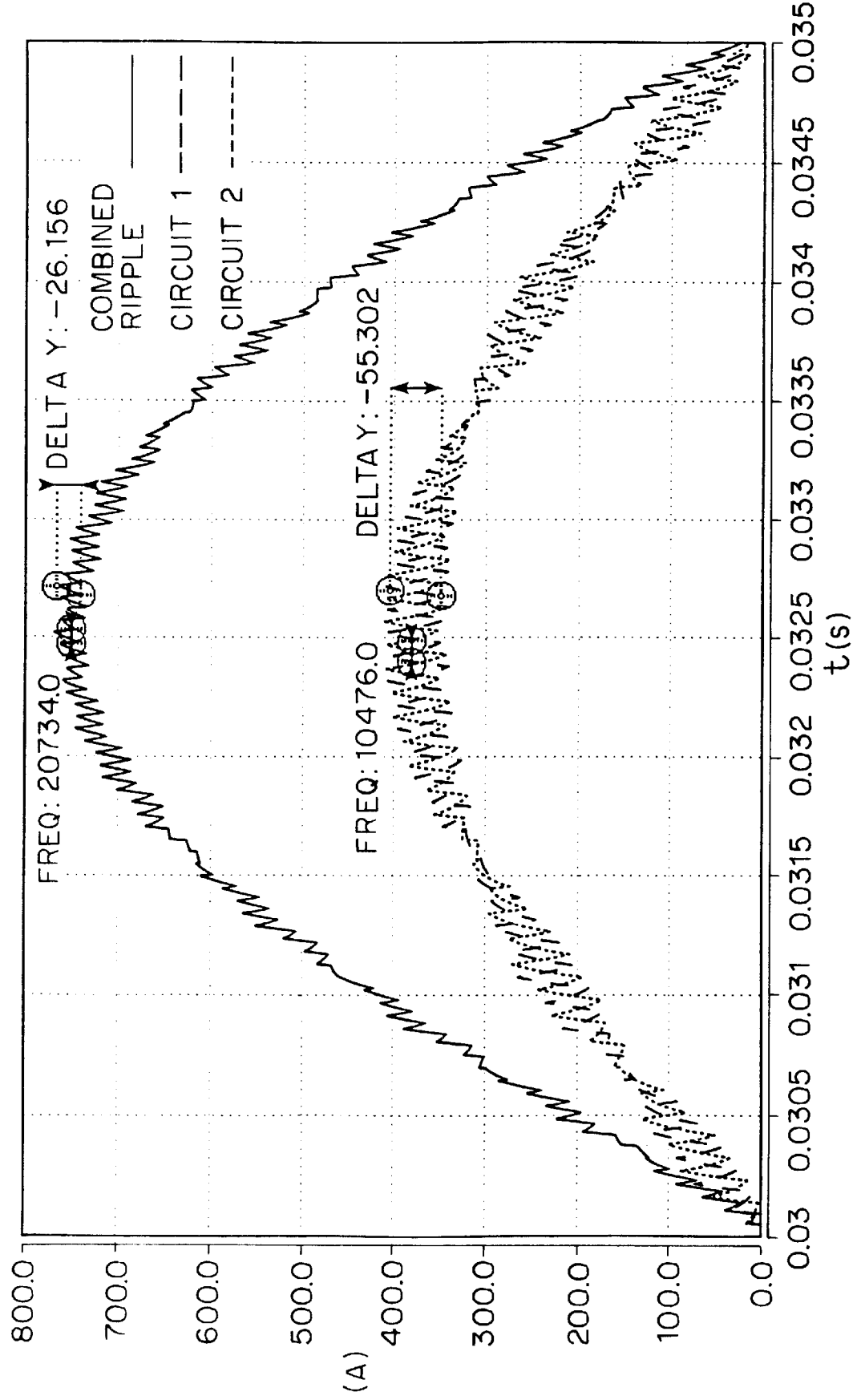
FIG. 16 is a graphical illustration showing the output currents for two circuits of one phase; and, FIG. 17 is a schematic circuit diagram of a multi-circuit motor drive having an interphase transformer-coupled output.

The illustrated results can be scaled to multiple output phases since each single-phase output drive differs only by the phase angle. The simulated drive system consists of three main components, i.e. a nine-phase, two-circuit generator, a single-phase, three-level, two-circuit motor drive and two single-phase R-L loads. It should be noted that the multi-step commutation procedure and pulse width modulation rectification were not implemented in the simulations. In the simulated arrangement represented in FIG. 12a, a synchronous generator is modeled as eighteen ideal voltage sources grouped into six isolated three-phase sources 110a–110f, each three-phase source producing 930 volts line-to-line at 250 Hz. The phase displacements among the three-phase sets, which is illustrated in FIG. 12b, results in a pulse current drawn by the drive as seen by the generator which has a frequency which is eighteen times the fundamental frequency of the generator.

The motor drive model consists of a series of hierarchical models including six three-phase sources, three matrix sequencers, two three-circuit matrix hierarchical models, two R-L loads, a modulation index reference and a frequency reference. The two three-circuit matrix models each contain three PWM drivers, three matrix mappers and eighteen bidirectional logic control switches.

The reference signal for the PWM drivers for this simulation was a single-phase 100 Hz sinusoid with the modulation index of 0.8. The PWM frequency was 1666 Hz and the time delays calculated according to the two-dimensional interleaving scheme are illustrated in Table 4 below.

TABLE 4

Phase Relationship Between Triangle Carrier Waveforms
for a Single-Phase, Three-Level, Two-Circuit PWM Generator

| | Time Shift (from 0°) Circuit (αkt = 30°) | |
|---|---|---|
| Level (αlvl = 60°) | 1 | 2 |
| 1 | 0.0 | 0.05 ms |
| 2 | 0.1 ms | 0.15 ms |
| 3 | 0.2 ms | 0.25 ms |

For the motor drive model described above the effective switching frequency is $f_{eff}=2 \cdot 3 \cdot 21666.7$ $H_z=20$ $kH_z$. The results of this simulation are illustrated in FIGS. 13–16.

Figure 17:
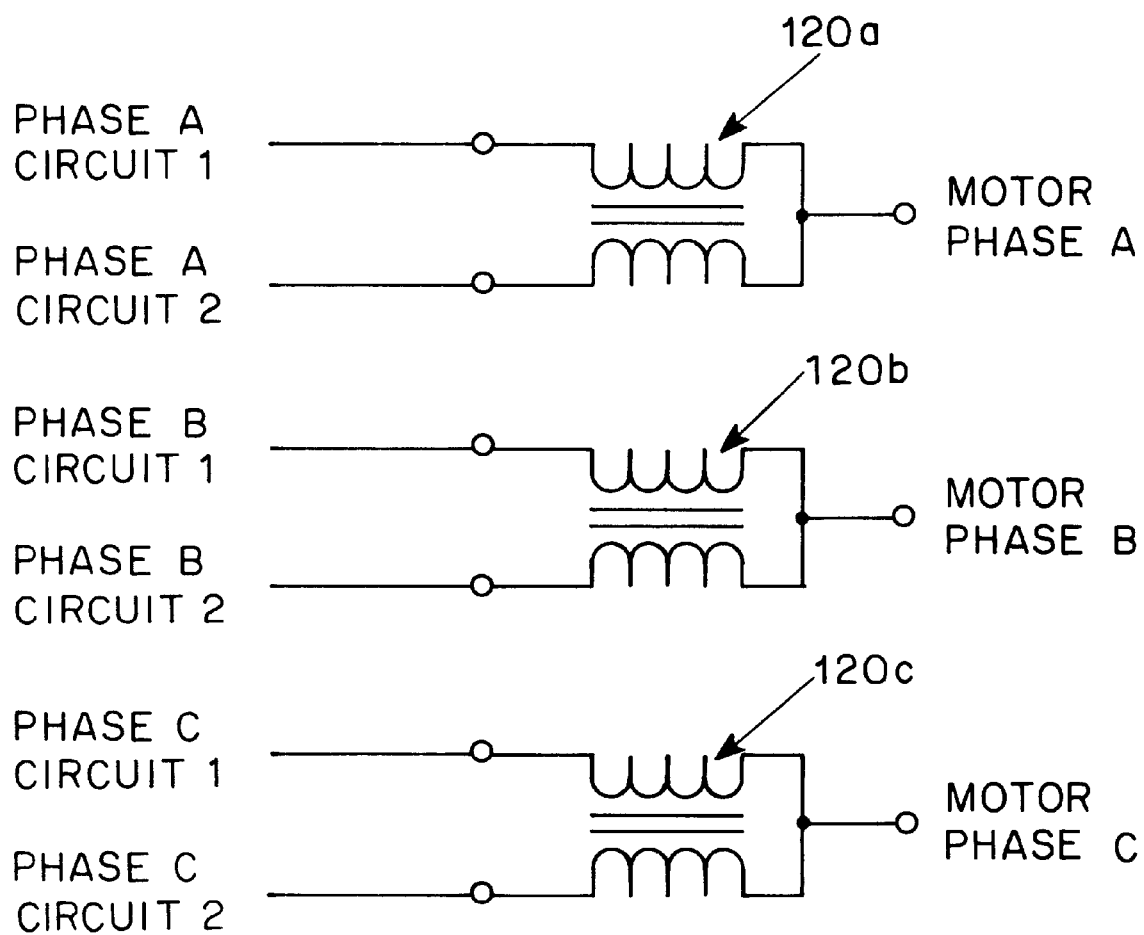

In an alternative embodiment, a motor having a number of circuits which is less than the number of circuits in the input stage is driven through a series of interphase transformers 120a, 120b and 120c shown in FIG. 17. These interface transformers provide very high impedance to high frequency differential currents which effectively isolates the drive circuits from each other.

While the preferred embodiment utilizes a sine-triangle modulation scheme, it is possible to implement other modulation schemes typically applied to AC-AC converters. Any modulation scheme suitable for a multi-level drive may be applied to the present invention.

Although the invention has been described herein with reference to specific embodiments, many modifications and variations therein will readily occur to those skilled in the art. Accordingly, all such variations and modifications are included within the intended scope of the invention.

We claim:

1. A variable speed motor drive arrangement comprising a plurality of motor drive circuits each having a plurality of levels supplied with isolated AC power from a plurality of AC phases and including semiconductor switch means for controlling the selection of the phases to provide an effective DC power supply, means for providing pulse width modulation of the switches utilizing interleaving of switch operation to provide a high effective switching frequency, and a motor having a stator wound with a plurality of isolated multi-phase circuits each of which receives power from one of the phases of the power supply.

2. A variable speed motor drive arrangement according to claim 1 including means for turning off selected multi-phase circuits to reduce power from the motor drive while maintaining symmetrical operating circuits.

3. A variable speed motor drive arrangement according to claim 2 wherein the circuits which are not turned off are symmetrically distributed with respect to the stator circuit arrangement.

4. A variable speed motor drive arrangement according to claim 1 wherein each multi-level phase driver comprises a plurality of H-bridges connected in series.

5. A variable speed motor drive arrangement according to claim 1 including means for interleaving carrier waveforms for controlling operation of the semiconductor switch means, and means for shutting down selected interleaved carrier waveforms for partitioning the load.

6. A variable speed motor drive arrangement according to claim 1 including means for providing carrier waveforms to each of the plurality of motor drive circuits and means for shutting down the carrier waveform for one or more selected circuits for partitioning of the load.

7. A variable speed motor drive arrangement according to claim 1 including means for shutting down one or more of the motor drive levels for partitioning of the load.

8. A variable speed motor drive arrangement according to claim 1 wherein the motor has a number of circuits which is less than the number of motor drive circuits and including a plurality of interface transformers for isolating the drive circuits from each other.

9. A variable speed motor drive arrangement according to claim 1 wherein each semiconductor switch is a bidirectional two-quadrant power semiconductor switch.

10. A variable speed motor drive arrangement according to claim 1 wherein each semiconductor switch is a bidirectional three-quadrant power semiconductor switch.

11. A method for driving a motor at variable speed comprising providing isolated AC power input to each of a plurality of levels in each of a plurality of motor drive circuits from a plurality of AC phases, providing H-bridge switches in each of the plurality of circuits, actuating the H-bridge switches to supply the highest AC input signal in each level and to provide a cumulative effective DC output for each circuit, interleaving the operation of the H-bridge switches in each circuit to provide a high effective switching frequency and supplying the respective circuit outputs to corresponding circuits of a variable speed motor.

12. A method according to claim 11 including selectively shutting down one or more motor drive circuits to partition the load.

13. A method according to claim 11 including selectively shutting down one or more motor drive levels to partition the load.

14. A method according to claim 11 including providing interleaved carrier waveforms for controlling operation of the H-bridge switches and selectively shutting down one or more carrier waveforms to partition the load.

* * * * *

UNITED STATES PATENT AND TRADEMARK OFFICE
CERTIFICATE OF CORRECTION

PATENT NO. : 6,118,932  
DATED : September 12, 2000  
INVENTOR(S) : Maurio et al.

Page 1 of 1

It is certified that error appears in the above-identified patent and that said Letters Patent is hereby corrected as shown below:

Column 10,  
Line 55, "claim 1 1" should read -- claim 11 --.

Column 1,  
Line 5, "APPLICATIONS" should read -- APPLICATION --.

Column 4,  
Line 25, "$V_{\alpha 1}c_1$" should read -- $Va_1c_1$ --.  
Line 67, "2/k" should read -- $2l/k$ --.

Column 5,  
Line 14, "at" should read -- and --.  
Line 29, "know" should read -- known --.

Column 7,  
Line 2, "*IEE*" should read -- *IEEE* --.  
Line 44, "Van" should read -- $V_{an}$ --.  
Line 46, "Van" should read -- $V_{an}$ --.

Column 9,  
Line 38, "2·3·21666.7" should read -- 2·3·2 1666.7 --.  
Line 38, "$H_z$" should read -- Hz -- and "$kH_z$" should read -- kHz. --.

Signed and Sealed this

Thirteenth Day of November, 2001

*Attest:*

*Nicholas P. Godici*

*Attesting Officer*

NICHOLAS P. GODICI  
*Acting Director of the United States Patent and Trademark Office*